United States Patent
Efrati et al.

(10) Patent No.: US 8,989,359 B2
(45) Date of Patent: Mar. 24, 2015

(54) METHODS AND SYSTEMS FOR DYNAMICALLY CHANGING CONTACT INFORMATION

(71) Applicant: Vonage Network LLC, Holmdel, NJ (US)

(72) Inventors: Tzahi Efrati, Hoboken, NJ (US); Boaz Zehavi, Jersey City, NJ (US)

(73) Assignee: Vonage Network LLC, Holmdel, NJ (US)

( * ) Notice: Subject to any disclaimer, the term of this patent is extended or adjusted under 35 U.S.C. 154(b) by 0 days.

(21) Appl. No.: 13/907,201

(22) Filed: May 31, 2013

(65) Prior Publication Data

US 2014/0357238 A1   Dec. 4, 2014

(51) Int. Cl.

| | |
|---|---|
| H04M 3/42 | (2006.01) |
| H04M 1/64 | (2006.01) |
| H04M 1/725 | (2006.01) |
| G06F 7/00 | (2006.01) |
| G06F 17/00 | (2006.01) |
| G06F 15/167 | (2006.01) |
| H04W 4/16 | (2009.01) |
| H04W 4/12 | (2009.01) |

(52) U.S. Cl.
CPC . *H04W 4/16* (2013.01); *H04W 4/12* (2013.01)
USPC ............... 379/201.01; 379/88.12; 455/414.1; 455/412.1; 707/610; 707/622; 709/213; 709/216

(58) Field of Classification Search
CPC .................. H04M 1/274516; H04L 29/12122; H04L 67/26; H04L 67/1095
USPC ............ 379/201.01, 88.12; 455/414.1, 412.1, 455/418, 415; 709/217, 213, 216; 705/1; 707/610, 622

See application file for complete search history.

(56) References Cited

U.S. PATENT DOCUMENTS

| | | | |
|---|---|---|---|
| 2004/0128151 A1* | 7/2004 | Mock et al. ...................... 705/1 |
| 2008/0005263 A1* | 1/2008 | Baraev et al. ................. 709/217 |
| 2010/0076926 A1* | 3/2010 | Lecciso et al. ................ 707/610 |
| 2011/0231407 A1 | 9/2011 | Gupta |
| 2013/0244622 A1* | 9/2013 | Hillier et al. ............... 455/414.1 |

FOREIGN PATENT DOCUMENTS

CN    WO2011150881    5/2012

* cited by examiner

*Primary Examiner* — Thjuan K Addy
(74) *Attorney, Agent, or Firm* — Moser Taboada; Joseph Pagnotta

(57) ABSTRACT

A system and method for dynamically changing contact information is presented. The system and method includes receiving a contact information change associated with a contact in a first contact list, determining that the contact is also in a second contact list and modifying the second contact list based on the contact information change.

15 Claims, 4 Drawing Sheets

METHODS AND SYSTEMS FOR DYNAMICALLY CHANGING CONTACT INFORMATION

BACKGROUND OF THE INVENTION

1. Field of the Invention

The present invention generally relates to communication systems and devices and more particularly to methods and systems for managing contact information.

2. Description of the Related Art

Portable devices such as cell phones, smart phones, tablets and more are becoming ubiquitous in society. People are increasingly staying in touch through the use of such devices. These devices have the ability to manage phone lists, email addresses and the like for users in what is commonly referred to as a contact list. The information that can be stored and utilized in the contact list ranges from the very basic (e.g., name and phone number) to the relatively more comprehensive (e.g., email address, picture, social networking accounts, etc.). As a result, the contact lists people establish and maintain have proliferated. Making the issue more challenging is the fact that people frequently change their contact information for many reasons. Thus, it is increasingly difficult to ensure that information contained in contact lists is up-to-date.

Accordingly, there is a need for a system and method that can automatically notify and assist users in incorporating changes to contact lists.

SUMMARY OF THE INVENTION

A system and method for dynamically changing contact information is presented. The system and method includes receiving a contact information change associated with a contact in a first contact list, determining that the contact is also in a second contact list and modifying the second contact list based on the contact information change.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
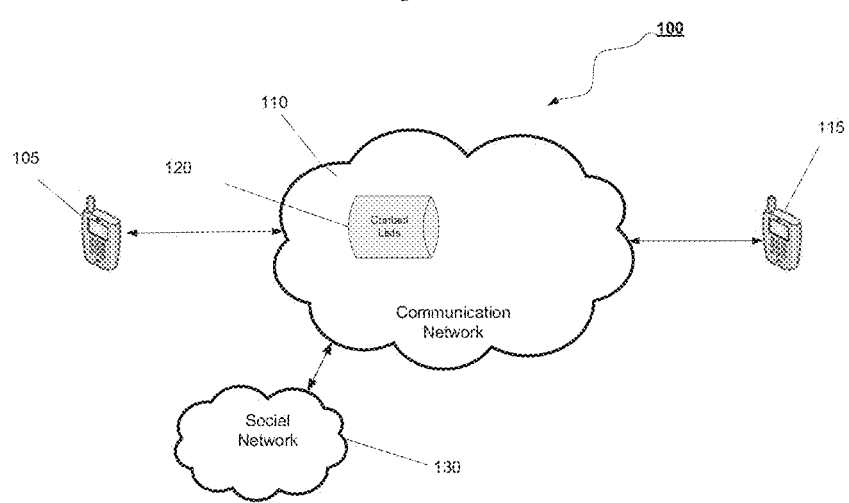
FIG. 1 is an illustration of an exemplary communication system in accordance with one or more embodiments of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

In the following description, references are made to a telephony device. The term "telephony device" or "communication device" is intended to encompass any type of device capable of acting as a telephony device. This includes a traditional analog telephone, an Internet Protocol (IP) telephone, a computer running IP telephony software, cellular telephones, mobile telephony devices such as smartphones that can connect to a data network and run software applications, such as the Apple iPhone™, mobile telephony devices running the Android™ operating system, Blackberry™ mobile telephones, and mobile telephones running the Symbian® operating system.

Moreover, certain devices that are not traditionally used as telephony devices may act as telephony devices once they are configured with appropriate client software. Thus, some devices that would not normally be considered telephony devices may become telephony devices or IP telephony devices once they are running appropriate software. One example would be a desktop or a laptop computer that is running software that can interact with an IP telephony system over a data network to conduct telephone calls. Another example would be a portable computing device, such as an Apple iPod Touch™, which includes a speaker and a microphone. A software application loaded onto an Apple iPod Touch™ can be run so that the Apple iPod Touch can interact with an IP telephony system to conduct a telephone call.

The present technology relates to enhancing the notification and updating of contact information. The notification and updating of contact information can be implemented within a variety of systems and devices. In the processes described below, the display and ordering of the contact information can, for example, be implemented at an IP telephony system responsible for managing contact information for one or more users. The implementation can also be performed using a software application on one or more communication devices where the communication devices will modify the display and/or order of contact information.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is an illustration of an exemplary communication system 100 including a communication network 110, a first user device 105 and a second user device 115. The communication network 110 may be one or more networks such as Internet Protocol (IP) networks or public switched telephone networks (PSTN) used to connect the devices. Communication network 110 (or one or more of its constituent networks) may maintain user account information, including contact lists in a database 120 for example of the first user device 105 and the second user device 115.

Figure 2:
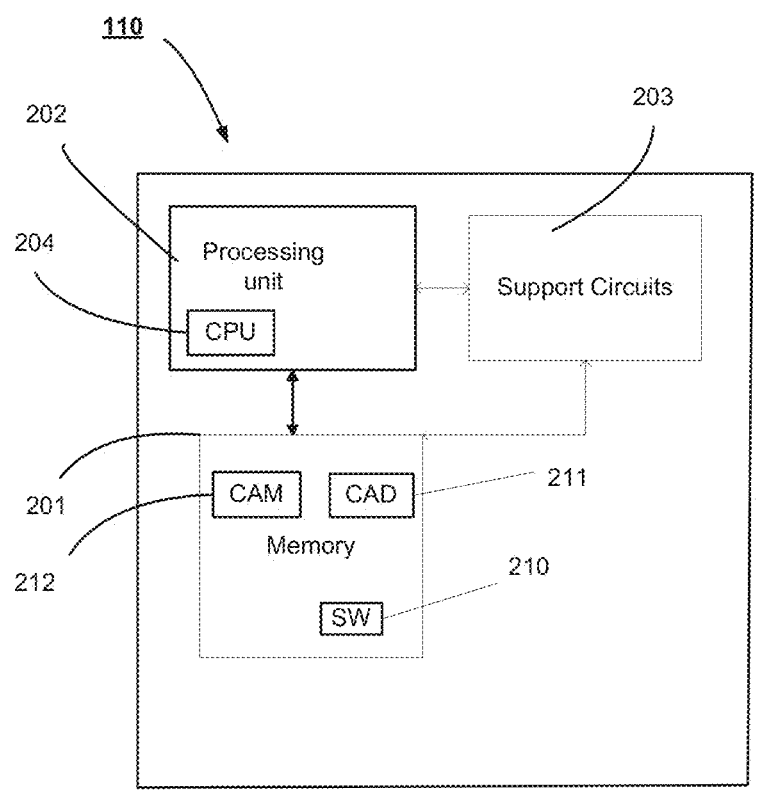
FIG. 2 is a block diagram of exemplary elements of a communication network in accordance with one or more embodiments of the invention.

Referring to FIG. 2, elements of a communication network 110 are shown, including a processing unit 202 that may be used to provide various functions of the provider network including the methods discussed herein. The communication network 110 may contain multiple processing units, databases and other elements and FIG. 2 is presented only as an illustration of an exemplary embodiment of the present invention.

Processing unit 202 is in communication with a contact lists database 120 which may store the contact lists of user accounts in communication network 110. The contact lists database 120 may, but need not, reside on the communication network and optionally may be remotely accessible (e.g., cloud based computing environment).

The processing unit 202 shown may be one of any form of a general purpose computer processor used in processing data in a provider network. The processing unit 202 comprises a central processing unit (CPU) 204. Communication network 110 includes support circuits 203 for the processing unit 202 and a memory unit 201. The processing unit 202 also includes provisions for connecting the processing unit 202 to customer equipment, to service provider equipment and to IP networks, as well as possibly one or more input/output devices (not shown) for accessing the processing unit and/or performing ancillary or administrative functions related thereto.

The memory unit 201 may include a Contact Association Determination module (CAD) 211 and a Contact Association Message module (CAM) 212 in accordance with some embodiments of the present invention.

The support circuits 203 and the CPU 204 for supporting the processing unit 202 are connected in a conventional manner. These circuits include cache, power supplies, clock circuits, input/output circuitry and subsystems, and the like.

The contact lists database 120 may contain a plurality of individual contact lists for each user of communication network 110. The contact lists in contact lists database 120 may include attributes for each contact such as, phone numbers, addresses, email addresses, social media accounts, employer contact details and the like. Thus, contact information may be associated with a given user and, moreover, the user may have an individual contact list that further contains contact information for contacts in that list.

The contact lists database 120 is also capable of providing various other items of information associated with contacts in the individual contact list. For example, John Smith may not only have various contacts in his contact list, but may also have other lists of contacts such as a social network account for social network 130 in which contacts in his social network "connections" are listed. In this example, a user's individual contact list may be connected to other contact lists from which contact information may be retrieved. In the case of a social network 130, the contact may have provided the communication network 110 with permission to obtain information from the contact's account with the social network 130. The contact may have also provided the communication network 110 with the contact's credentials on the social network 130, in the form of a user name and password, so that communication network 110 can log into the social network 130 to review and retrieve information from the contact's account on the social network 130. In some instances, communication network 110 may have received authorization from a user to access certain information on a social network 130, and communication network 110 may be able to access this information without actually logging into the social network 130 with the user's name and password. One skilled in the art can understand that the above example of the social network 130 may be applied to other systems in which connections between individuals are established.

A computer program or software routine (SW) 210 when executed by the CPU 204, causes the processing unit 202 to perform processes of the disclosed embodiments, and is generally stored in a memory or computer-readable medium, which may be one or more of readily available memory such as random access memory (RAM), read only memory (ROM), floppy disk, hard disk, flash memory or any other form of digital storage, local or remote, and is preferably of non-volatile nature. Also, the software routines could also be stored remotely from the CPU 204. For example, the software could be resident on servers and memory devices that are located remotely from the CPU 204, but which are accessible to the CPU 204 via a data network connection.

The computer program or software routine 210, when executed by the CPU 204, transforms the general purpose computer into a specific purpose computer that performs one or more functions of the methods and systems of the disclosed embodiments. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine of the disclosed embodiments is capable of being executed on any computer operating system, and is capable of being performed using any CPU architecture.

Figure 3:
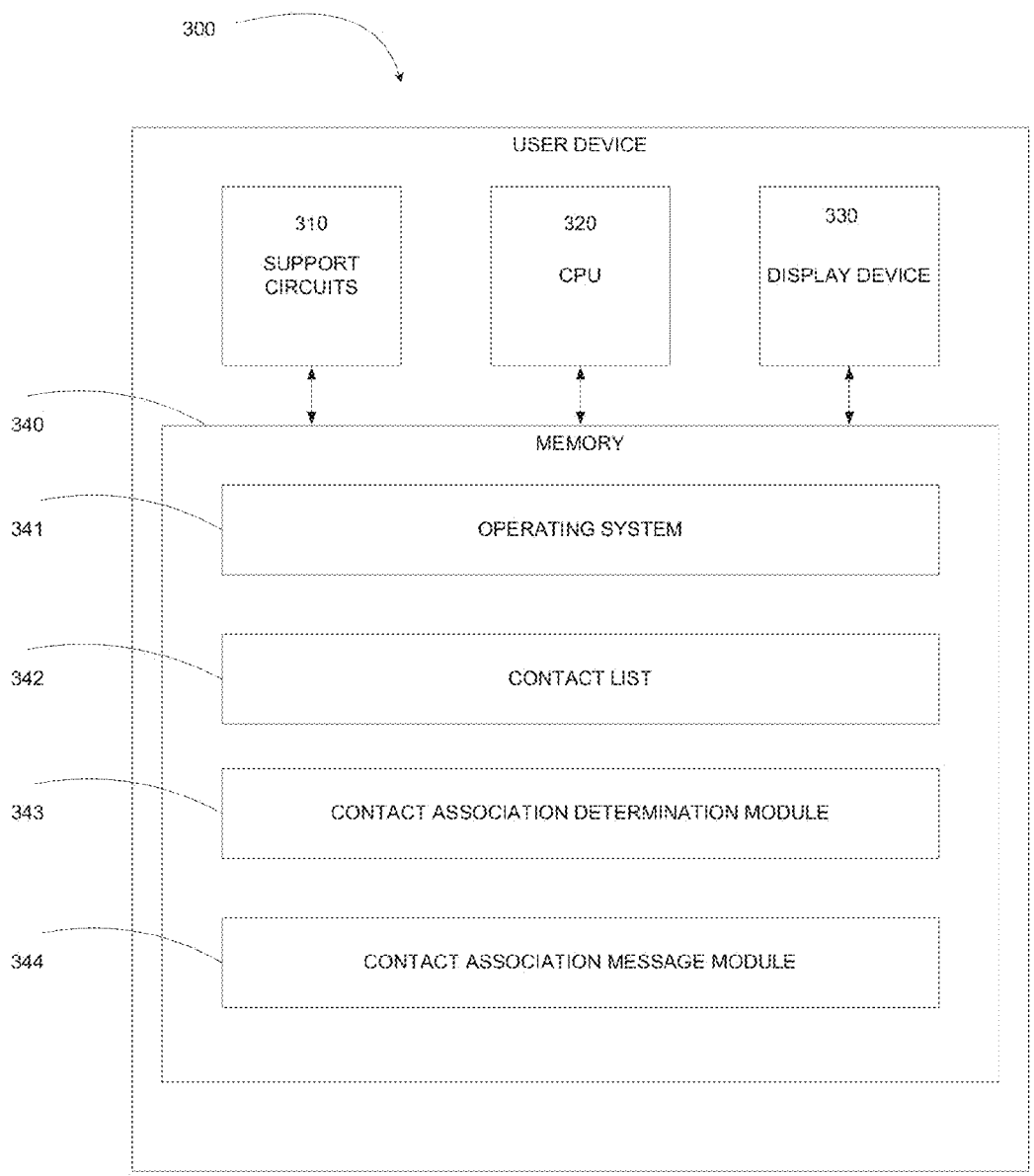
FIG. 3 is a block diagram of exemplary elements of a user device in accordance with one or more embodiments of the invention.

FIG. 3 depicts a block diagram of an exemplary user device 300 (e.g., 105 and 115) for identifying a set of associated contacts according to one or more embodiments. The user device 300 comprises a Central Processing Unit (CPU) 320, support circuits 310, a memory 340, and the display device 330. The CPU 320 may comprise one or more commercially available microprocessors or microcontrollers that facilitate data processing and storage. The various support circuits 310 facilitate the operation of the CPU 320 and include one or more of clock circuits, power supplies, cache, input/output circuits, and the like. The memory 340 comprises at least one of Read Only Memory (ROM), Random Access Memory (RAM), disk drive storage, optical storage, removable storage and/or the like. In some embodiments, the display device 330 may be a touch screen able to accept input from a user's finger or input from a stylus. In some embodiments, the memory 340 comprises an operating system 341, contact list 342, contact association determination module 343, and contact association message module 344.

Figure 4:
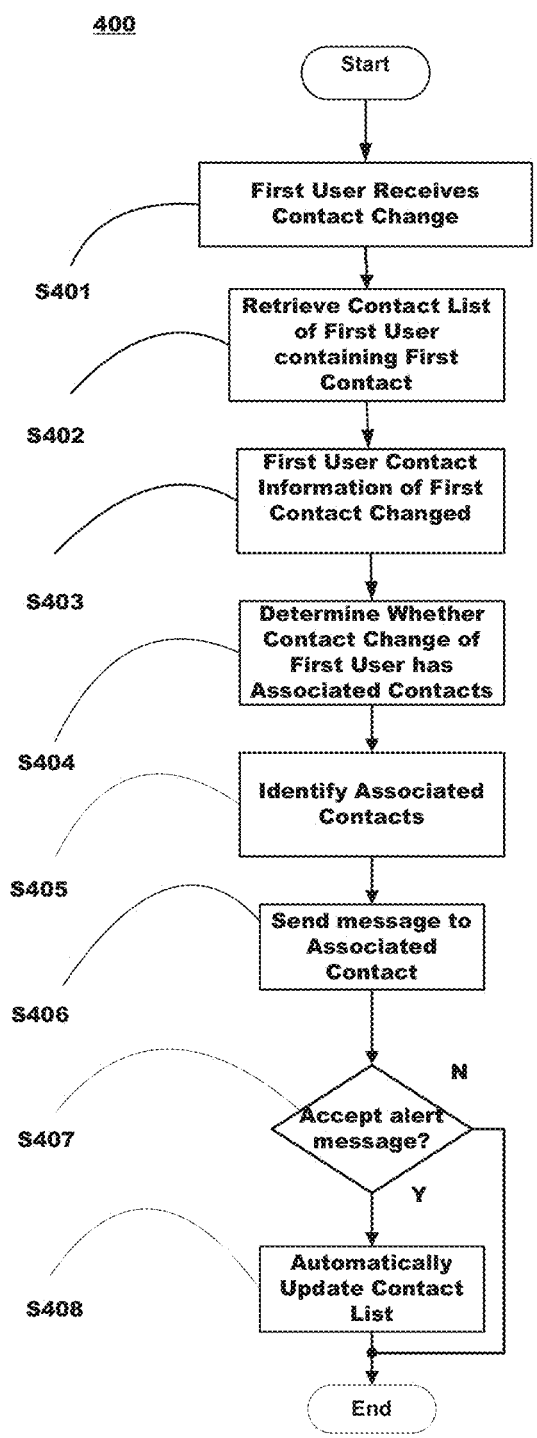
FIG. 4 is a flow diagram of an exemplary contact information change process in accordance with embodiments of the invention.

FIG. 4 is a flow diagram of an exemplary contact information change process 400 in accordance with embodiments of the invention. At step S401, a contact information change associated with a first contact is received. In some embodiments, the contact information change is received at first device 105. In other embodiments, the contact information change is received at the communication network 110

The contact information change may be a result of the first contact obtaining a new job, a change in the first contact's physical address, changing a telephony service resulting in a new phone number or the like. Furthermore, the first user may receive notification of the first contact information change from a message in electronic form such as an SMS or email or the first contact may inform the first user through a direct conversation by phone or in person for example.

At step S402, a first contact list containing the first contact is retrieved. The first contact list may be retrieved from contact list 342 in memory 340 on first device 105, or may be retrieved from contact list database 120 in communication with communication network 110. The first contact list may include a plurality of contacts, each contact associated with at least one contact attribute. Contact attributes may include, for example, a contact name, an email address, a phone number, a physical address, a picture or a social networking or other affiliation ID. The contact information of a given contact comprises the contact attributes associated with that contact.

At step S403, the contact information of the first contact in the first contact list is changed based on the received contact information change. The change in the contact information may be performed on first device 105 and may further be uploaded to database 120, or may be applied directly to the contact list on database 120 and may be pushed to the first device 105.

At step S404, it is determined whether the first contact is contained on a second contact list of a plurality of contact lists. The determination may be performed on first user device 105 or on communication network 110.

On first user device 105, the determination is performed by Contact Association Determination (CAD) module 343. CAD module 343 causes a search of the plurality of contacts in the first contact list 342 for a second user having a second contact list also containing the first contact for which the contact information change should be applied. CAD module 343 sends an inquiry to each contact in the first contact list 342 to determine if a second contact list of a second user contains the first contact. The inquiry is processed through a CAD module contained on each of the inquired user devices. The inquiry from module 343 is received at second device 115 which contains a CAD module through which the inquiry of the second contact list proceeds. The search compares the attributes of the first contact to identify the first contact in the second contact list. The attributes may include, for example, a contact name, an email address, a phone number, a physical address, a picture or a social networking or other affiliation ID. The search concludes with a determination of a second contact list of the second user containing the first contact.

On communication network 110, Contact Association Determination (CAD) module 211 in memory unit 201 causes a search of the plurality of contact lists in contact list database 120 for a second user having a second contact list also containing the first contact for which the contact information change should be applied. CAD module 211 searches contact list database 120 for each individual contact list of each contact in the first contact list. The search compares the attributes of first contact with the attributes of each contact in the individual contact lists in database 120 to determine a second contact list containing the first contact. The attributes are searchable criteria and may include, for example, a contact name, an email address, a phone number, a physical address, a picture (searchable by facial recognition methods known in the art) or a social networking or other affiliation ID. The search determines the second contact list of the second user that contains the first contact.

At step S405, the second user is identified. On first device 105, the second user will be a contact in the first contact list. On communication network 110, once the second contact list is determined on communication network 110 the second user as owner of the second contact list is identified. One skilled in the art would understand that more than one contact list may be determined and more than one user may be identified.

At step S406, on first device 105, a message is generated and provided to the second user on second user device 115 alerting the second user of the contact information change through Contact Association Message (CAM) module 344. On communication network 110, a message is generated and sent to the second user alerting the second user of the contact information change through CAM module 212. The second user may accept the alert or decline the alert. If the second user declines the alert no change is made and the process ends. If the second user accepts the alert, the change of contact information is automatically applied to the second contact list at step S408. The applied change may be generated from communication network 110 or from first user device 105.

In some embodiments of the invention, multiple parties may be included in the determination of associated contacts.

The embodiments discussed and figures presented are meant only as examples to illustrate the embodiments of the invention and are not intended as a limitation of the invention. Many variations may be employed in embodiments of the invention.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A method for dynamically changing contact information comprising:
   receiving a contact information change associated with a first contact of a plurality of contacts stored in a first contact list, wherein the first contact list is associated with a first user, and wherein the first contact and the first user are not the same;
   searching contact lists associated with each of the plurality of contacts stored in the first contact list to determine if the first contact is stored in another contact list;
   determining that the first contact is also in a second contact list, associated with a second user, wherein the second user is a contact in the first contact list; and
   modifying the second contact list based on the contact information change.

2. The method of claim 1, further comprising:
   providing a message to the second user indicative of the contact information change.

3. The method of claim 2, wherein the message comprises options for accepting or declining the contact information change.

4. The method of claim 1, wherein the contact information includes one or more attributes to identify the first contact.

5. The method of claim 4, wherein the one or more attributes includes a name, an email address, a phone number, a physical address, a picture or a social networking ID.

6. The method of claim 1, wherein the first contact list resides on a first device.

7. The method of claim 1, wherein the second contact list resides on a second device.

8. The method of claim 7, wherein the determining step further comprises: receiving an inquiry at the second device to search the second contact list for the first contact.

9. The method of claim 1, wherein at least one of the first contact list or the second contact list reside on a communication network.

10. The method of claim 9, wherein the determining step further comprises: searching a plurality of contact lists in a contact list database in communication with the communication network for the first contact in the second contact list.

11. A system for dynamically changing contact information comprising:
    a memory;
    a processor in communication with the memory configured to:
        receive a contact information change associated with a first contact of a plurality of contacts stored in a first contact list, wherein the first contact list is associated with a first user, and wherein the first contact and the first user are not the same;
        search contact lists associated with each of the plurality of contacts stored in the first contact list to determine if the first contact is stored in another contact list;
        determine if the first contact is also in a second contact list associated with a second user, wherein the second user is a contact in the first contact list; and
        modify the second contact list based on the contact information change.

12. The system of claim 11, wherein at least one of the first contact list or the second contact list is stored on a communication network.

13. The system of claim 12, wherein the processor is further configured to search a plurality of contact lists in a contact list database in communication with the communication network for the first contact in the second contact list.

14. The system of claim 11, further including a first device for storing the first contact list and a second device for storing the second contact list.

15. The system of claim 14, wherein the second device receives an inquiry to search the second contact list for the first contact.

* * * * *